US012568369B2

(12) United States Patent
Patil et al.

(10) Patent No.: US 12,568,369 B2
(45) Date of Patent: Mar. 3, 2026

(54) INTERNET PROTOCOL (IP) ASSIGNMENT AND SECURE TRAFFIC FOR NETWORK ELEMENTS DEPLOYED OVER UNTRUSTED TRANSPORT NETWORK

(71) Applicant: RAKUTEN SYMPHONY, INC., Tokyo (JP)

(72) Inventors: Deepak Shivanagouda Patil, Karnataka (IN); Basawaraj Eshwaraj Nadagatti, Karnataka (IN); Satish Singh, Karnataka (IN); Ravi Ramesh Bhat, Karnataka (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 75 days.

(21) Appl. No.: 18/688,535

(22) PCT Filed: Jan. 11, 2024

(86) PCT No.: PCT/US2024/011217
§ 371 (c)(1),
(2) Date: Mar. 1, 2024

(87) PCT Pub. No.: WO2025/095995
PCT Pub. Date: May 8, 2025

(65) Prior Publication Data
US 2025/0247694 A1 Jul. 31, 2025

(30) Foreign Application Priority Data
Oct. 31, 2023 (IN) .............................. 202341074270

(51) Int. Cl.
*H04W 12/06* (2021.01)
(52) U.S. Cl.
CPC .................................. *H04W 12/06* (2013.01)

(58) Field of Classification Search
CPC ...................................................... H04W 12/06
See application file for complete search history.

(56) References Cited

U.S. PATENT DOCUMENTS 7,304,974 B2 * 12/2007 Yang ..................... H04W 76/12
370/338
11,917,527 B2 * 2/2024 Chou ..................... H04W 24/02
(Continued)

OTHER PUBLICATIONS

M. Polese, L. Bonati, S. D'Oro, S. Basagni and T. Melodia, "Understanding O-RAN: Architecture, Interfaces, Algorithms, Security, and Research Challenges," in IEEE Communications Surveys & Tutorials, vol. 25, No. 2, pp. 1376-1411, Secondquarter 2023. (Year: 2023).*

(Continued)

*Primary Examiner* — Kari L Schmidt
(74) *Attorney, Agent, or Firm* — Sughrue Mion, PLLC

(57) ABSTRACT

Embodiments of present disclosure disclose internet protocol (IP) assignment and secure traffic for network elements deployed over untrusted transport network. In an embodiment, base station (101) transmits an Open Cloud (O-cloud) available registration request to an operator network system (103) through First Secure Tunnel (FST) (133) established between operator network system (103) and base station (101). The FST is terminated upon receiving network information related to each of plurality of O-cloud entities of O-cloud through FST from operator network system. Thereafter, base station (101) transmits second authentication request to operator network system for establishing Second Secure Tunnel (SST) (135) between operator network system and base station. Finally, base station establishes SST between operator network system and base station when network information is authenticated. The established SST allows bi-directional traffic related to each of plurality of (Continued)

O-cloud entities. The present disclosure helps in handling the traffic at the operator network system.

9 Claims, 7 Drawing Sheets

(56) References Cited

U.S. PATENT DOCUMENTS

| | | | |
|---|---|---|---|
| 2011/0252230 A1* | 10/2011 | Segre | H04L 63/162 |
| | | | 713/171 |
| 2014/0023040 A1* | 1/2014 | Son | H04W 36/0235 |
| | | | 370/331 |
| 2017/0257886 A1* | 9/2017 | Adjakple | H04W 74/04 |
| 2019/0007409 A1* | 1/2019 | Totale | H04L 9/3247 |
| 2021/0258866 A1* | 8/2021 | Chou | H04W 48/16 |
| 2024/0104192 A1* | 3/2024 | Kalle | G06F 21/64 |
| 2024/0154658 A1* | 5/2024 | Chandwani | H04L 5/0051 |
| 2024/0259879 A1* | 8/2024 | Ranganath | H04L 41/5054 |
| 2025/0055681 A1* | 2/2025 | Ince | G06F 21/602 |

OTHER PUBLICATIONS

O-Ran Alliance, O-Ran Working Groupd 6 (Cloudification and ORchestration) Cloud Architecture and Deployment Scenarios for O-RAN Virtualized RAN, O-RAN.WG6.CADS-v08.01, Feb. 2025. (Year: 2025).*

Y. Huang et al., "Validation of Current O-RAN Technologies and Insights on the Future Evolution," in IEEE Journal on Selected Areas in Communications, vol. 42, No. 2, pp. 487-505, Feb. 2024. (Year: 2024).*

Y. Cao, T. Jiang and Z. Han, "A Survey of Emerging M2M Systems: Context, Task, and Objective," in IEEE Internet of Things Journal, vol. 3, No. 6, pp. 1246-1258, Dec. 2016. (Year: 2016).*

J. Groen et al., "Securing O-RAN Open Interfaces," in IEEE Transactions on Mobile Computing, vol. 23, No. 12, pp. 11265-11277, Dec. 2024. (Year: 2024).*

* cited by examiner

400

| Transmit an Open Cloud (O-cloud) available registration request to an operator network system through a first secure tunnel established between the operator network system and the base station | 401 |

↓

| Terminate the first secure tunnel upon receiving a network information related to each of a plurality of O-cloud entities of the O-cloud through the first secure tunnel from the operator network system in response to the registration request | 403 |

↓

| Transmit a second authentication request to the operator network system for establishing a second secure tunnel between the operator network system and the base station | 405 |

↓

| Establish the second secure tunnel between the operator network system and the base station when the network information related to each of the plurality of O-cloud entities is authenticated | 407 |

FIG. 4

INTERNET PROTOCOL (IP) ASSIGNMENT AND SECURE TRAFFIC FOR NETWORK ELEMENTS DEPLOYED OVER UNTRUSTED TRANSPORT NETWORK

CROSS REFERENCE TO RELATED APPLICATIONS

This application is a National Stage of International Application No. PCT/US2024/011217 filed Jan. 11, 2024, claiming priority based on Indian Patent Application No. 202341074270 filed Oct. 31, 2023.

TECHNICAL FIELD

The present disclosure generally relates to Internet Protocol (IP) assignment and secure traffic for network elements deployed over untrusted transport network.

BACKGROUND

In general, an operators network deploys an Evolved Node B (eNB) or a Next Generation Node B (gNB) at a cell site. The operators network manages the cell site and communicates with the cell site over an untrusted third party network. To ensure secured communication, the eNB or gNB at the cell site establishes an Internet Protocol (IP) secured tunnel between the operator network and the cell site. As a part of IP secured tunnel establishment, the operators network assigns an IP address to the eNB or gNB at the cell site. Once the IP secured tunnel is established, the operators network communicates to the eNB or gNB at the cell site using the IP secured tunnel.

As the network architecture is evolving and the eNB or gNB at the cell site is moving towards a disaggregated architecture, various elements within the eNB or gNB could be sourced from various vendors. In such scenario, each element within the eNB or gNB will be allocated with different IP address. The IP address to various elements within the eNB or gNB must be allocated by the operators network. However, existing mechanism allows allocation of only one IP address. Thus, it is desired to address the above-mentioned disadvantages or other shortcomings or at least provide a useful alternative to ensure allocation of IP addresses for various elements at the cell site.

The information disclosed in this background of the disclosure section is only for enhancement of understanding of the general background of the invention and should not be taken as an acknowledgement or any form of suggestion that this information forms the prior art already known to a person skilled in the art.

SUMMARY

In disaggregated Evolved Node B (eNB) or Next Generation Node B (gNB) architecture, each network element within the eNB or gNB must be assigned an Internet Protocol (IP) address. However, existing mechanism allows allocation of only one IP address. Therefore, the allocation of IP addresses with each network element within the eNB or gNB is required. The IP allocation may allow bi-direction traffic between multiple elements present at the eNB or gNB and within the operators network.

In an embodiment, a base station for Internet Protocol (IP) assignment and secure traffic for network elements deployed over untrusted transport network is disclosed. The base station comprises a processor and a memory. The memory is communicatively coupled to the processor and stores processor-executable instructions, which on execution, cause the processor to transmit an Open Cloud (O-cloud) available registration request to an operator network system through a first secure tunnel established between the operator network system and the base station. The registration request comprises an O-cloud Identification (ID) of an O-cloud associated with base station of a cell site. Further, the processor terminates the first secure tunnel upon receiving a network information related to each of a plurality of O-cloud entities of the O-cloud through the first secure tunnel from the operator network system in response to the registration request. Thereafter, the processor, transmits a second authentication request to the operator network system for establishing a second secure tunnel between the operator network system and the base station. The second authentication request comprises the network information related to each of the plurality of O-cloud entities and a base station operator signed certificate to be authenticated. Finally, the processor establishes the second secure tunnel between the operator network system and the base station when the network information related to each of the plurality of O-cloud entities is authenticated. The established second secure tunnel allows bi-directional traffic related to each of the plurality of O-cloud entities.

In another embodiment, a method for Internet Protocol (IP) assignment and secure traffic for network elements deployed over untrusted transport network is disclosed. The method includes transmitting, by a base station, an Open Cloud (O-cloud) available registration request to an operator network system through a first secure tunnel established between the operator network system and the base station. The registration request comprises an O-cloud Identification (ID) of an O-cloud associated with base station of a cell site. Further, the method comprises terminating the first secure tunnel upon receiving a network information related to each of a plurality of O-cloud entities of the O-cloud through the first secure tunnel from the operator network system in response to the registration request. Thereafter, the method comprises transmitting a second authentication request to the operator network system for establishing a second secure tunnel between the operator network system and the base station. The second authentication request comprises the network information related to each of the plurality of O-cloud entities and a base station operator signed certificate to be authenticated. Finally, the method comprises establishing the second secure tunnel between the operator network system and the base station when the network information related to each of the plurality of O-cloud entities is authenticated. The established second secure tunnel allows bi-directional traffic related to each of the plurality of O-cloud entities.

In yet another embodiment, a non-transitory computer readable medium including instructions stored thereon that when processed by at least one processor, cause a base station to perform operations comprising transmitting an Open Cloud (O-cloud) available registration request to an operator network system through a first secure tunnel established between the operator network system and the base station. The registration request comprises an O-cloud Identification (ID) of an O-cloud associated with base station of a cell site. Further, the instructions cause the processor to determine a status change of one or more cells of the serving DU and one or more candidate/target cells of a candidate/target DU amongst a plurality of candidate/target DU upon changing the serving cell for the UE to a new serving cell. The new serving cell is one of the one or more candidate/ target cells of a candidate/target DU. Thereafter, the instructions cause the processor to transmit a second authentication request to the operator network system for establishing a second secure tunnel between the operator network system and the base station. The second authentication request comprises the network information related to each of the plurality of O-cloud entities and a base station operator signed certificate to be authenticated. Finally, the instructions cause the processor to establish the second secure tunnel between the operator network system and the base station when the network information related to each of the plurality of O-cloud entities is authenticated. The established second secure tunnel allows bi-directional traffic related to each of the plurality of O-cloud entities.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

FIG. 4 shows a flowchart illustrating a method of Internet Protocol (IP) assignment and secure traffic for network elements deployed over untrusted transport network, in accordance with some embodiments of the present disclosure.

Figure 1A:
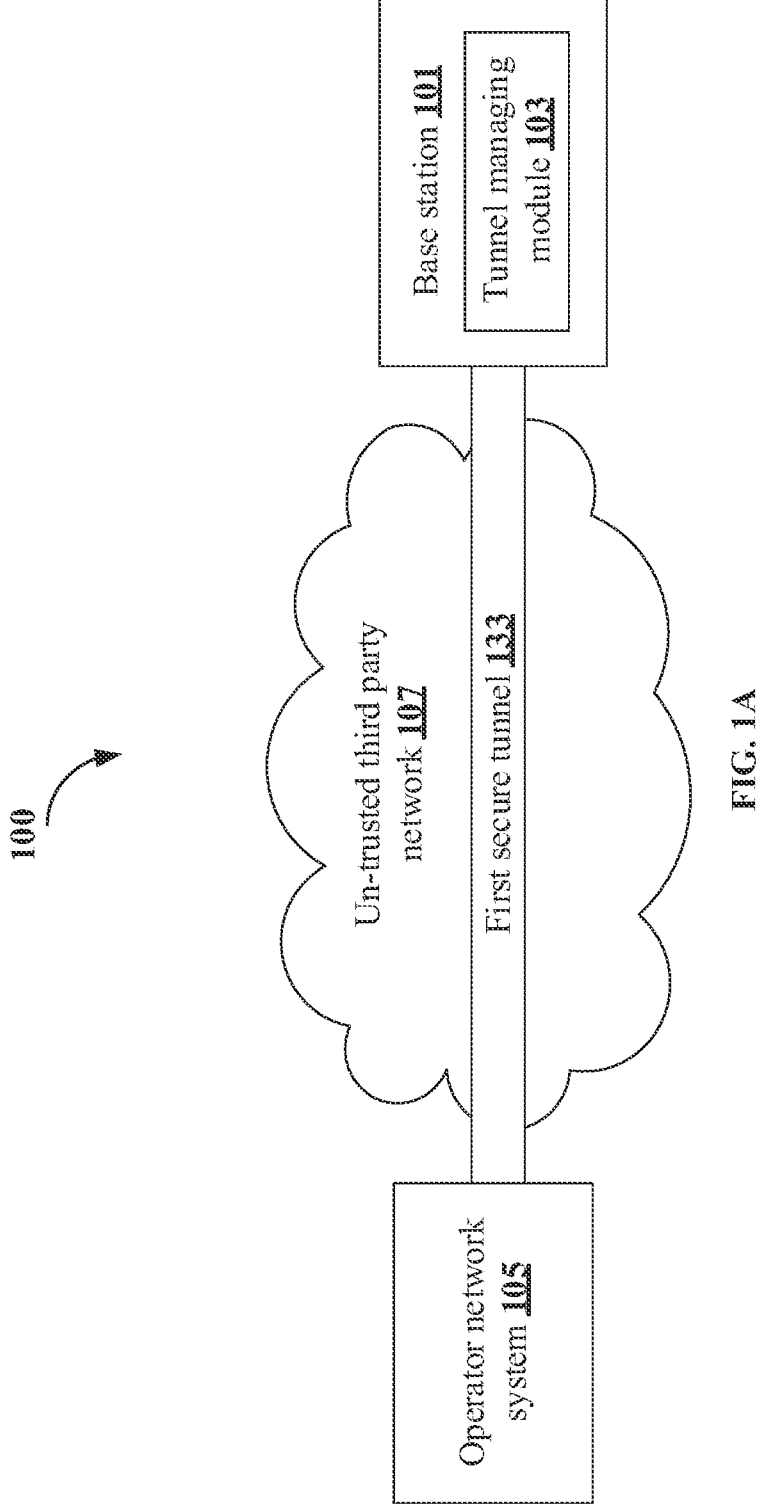
FIG. 1A shows an exemplary architecture illustrating first secure tunnel between a base station and an operator network system, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

It shall be noted that, for convenience of explanation, the disclosure uses terms and names defined in the 3rd Generation Partnership Project Radio Access Network (3GPP RAN) standards. More specifically, the terms 'Dynamic Host Configuration Protocol (DHCP) (local)', 'Open-Centralized Unit (O-CU)', 'Open-Distributed Unit (O-DU)', 'Open-Cloud (O-cloud)', 'Service Management and Orchestration (SMO)', 'Evolved Packet Core (EPC)/CORE' and 'Certificate Authority (CA) server' are to be interpreted as specified by the 3GPP RAN standards.

FIG. 1A shows an exemplary architecture illustrating first secure tunnel between a base station and an operator network system, in accordance with some embodiments of the present disclosure.

Exemplary architecture 100 illustrates a base station 101 and an operator network system 105 communicate over an un-trusted third party network 107. The base station 101 may include a tunnel managing module 103, which may be configured to perform the functionality of the present disclosure. The base station 101 may be deployed in a cell site. Each cell site may deploy one or more base stations. The number of base stations may vary based on the network planning and location of the cell site. As an example, the base station 101 may be an Evolved Node B (eNB) or a Next Generation Node B (gNB). In an embodiment, the base station 101 may include one or more entities, the one or more entities may include, without limitation, a Dynamic Host Configuration Protocol (DHCP) (local) 111, an Open-Centralized Unit (O-CU) 113, an Open-Distributed Unit (O-DU) 115 and Open-Cloud (O-cloud) 117. The O-DU 115 may be associated with one or more Open-Radio Units (O-RU) 1191-119N. The cell sites are deployed and managed by the operator network system 105 (also referred as network operator). The operator network system 105 also configures and optimizes the one or more base stations deployed in the cell site. In an embodiment, the operator network system 105 may include one or more entities, the one or more entities may include, without limitation, a Service Management and Orchestration (SMO) 121, an Evolved Packet Core (EPC)/CORE 123, a Certificate Authority (CA) server 125, O-CU 127 of the operator network system, DHCP+Domain Name System (DNS) 129, O-cloud 131 of the operator network system, operator security gateway 133 and operator staging server 135.

In an embodiment, the base station 101 and the operator network system 105 communicate over the un-trusted third party network 107. In an embodiment, the base station 101 may establish a secure tunnel between the base station 101 and the operator network system 105 to communicate securely. As an example, the secure tunnel may be a first secure tunnel 133 or a second secure tunnel 135. The establishment of the first secure tunnel 133 and the second secure tunnel 135 is explained in reference to FIG. 1B and below description. In an embodiment, at the time of network planning, network information related to the base station 101 may be configured in the operator network system 105. The network planning may include determining the number of base stations to be deployed at the cell site and determining a plurality of O-cloud entities of O-cloud associated with the base station 101. The network information may include, without limitation, at least one of an inner IP, traffic selectors, an IP mapping related to the O-Cloud and an internal Domain Name System (DNS), detected by the operator network system 105 based on the O-cloud ID. The inner IP may be the IP address of the base station 101. The traffic selectors, for example, may be a range of IP addresses of each of plurality of O-cloud entities. The IP mapping may be a look-up table which may map IP addresses with each of the plurality of O-cloud entities. The internal DNS may be an IP server which translates domain name to IP address.

In an embodiment, the base station 101 may be configured to transmit an Open Cloud (O-cloud) available registration request to the operator network system 105 through the first secure tunnel 133 established between the operator network system 105 and the base station 101. The registration request may include, without limitation, an O-Cloud Identification (ID) of an O-Cloud associated with base station 101 of the cell site. In an embodiment, prior to transmitting the registration request, when the base station 101 is powered ON, the base station 101 may acquire public IP address of the operator network system 105 from an untrusted/third-party router. Upon obtaining the public IP address of the operator network system 105, the base station 101 may initiate establishment of the first secure tunnel 133 by initiating, for example, an IKE_SA_INIT procedure. Thereafter, the base station 101 may transmit the first authentication request to the operator network system 105, for obtaining the inner IP of the base station 101. The first authentication request may be, for example, IKE_AUTH Request (CPRQ: Inner IP). The first authentication request may also include a predefined certificate related to the cell site to be authenticated.

As an example, the predefined certificate may be a vendor certificate. In an embodiment, the first secure tunnel 133 may be established when the predefined certificate received in the first authentication request is determined to be valid. The operator network system 105 transmits the first authentication response comprising an inner IP of the base station 101 to the base station 101 105. As an example, the first authentication response may be IKE_AUTH Response (CPRP: Inner IP, TSr: [CA Server IP/subnet, Operator SMO IP/subnet]). Upon receiving the first authentication response, the first secure tunnel 133 between the operator network system 105 and the base station 101 is established.

Figure 1B:
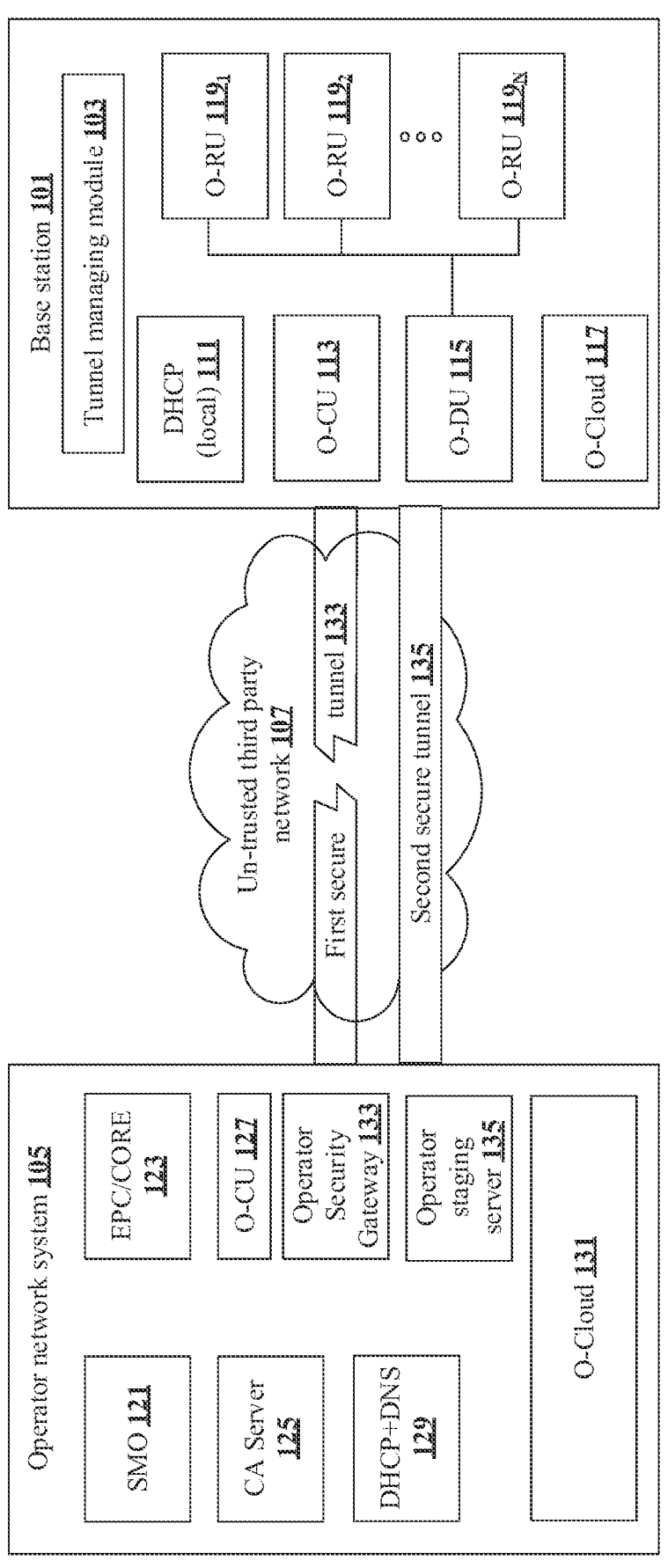
FIG. 1B shows a scenario an exemplary architecture illustrating termination of first secure tunnel and establishment of second secure tunnel between a base station and an operator network system, in accordance with some embodiments of the present disclosure.

In an embodiment, upon transmitting the O-cloud available registration request, the base station 101 may be configured to 133 receive the network information related to each of a plurality of O-cloud entities of the O-cloud through the first secure tunnel 133 from the operator network system 105. Upon receiving the network information, the base station 101 may terminate the first secure tunnel 133 as illustrated in FIG. 1B. The network information may be determined and transmitted by the operator network system 105 based on the O-cloud ID received from the base station 101. As an example, the network information may be stored in a database at the operator network system 105. Each of the plurality of O-cloud entities may be assigned with an IP number at the time of network planning. The base station 101 requests the traffic selectors which may be the range of IP addresses of each of plurality of O-cloud entities, from the operator network system 105.

In an embodiment, upon terminating the first secure tunnel 133, the base station 101 may be configured to transmit a second authentication request to the operator network system 105 for establishing the second secure tunnel 135 between the operator network system 105 and the base station 101. In an embodiment, prior to transmitting the second authentication request, the base station 101 may initiate establishment of the second secure tunnel 135 by initiating IKE_SA_INIT procedure. Thereafter, the base station 101 may transmit the second authentication request to the operator network system 105, for establishing the second secure tunnel 135. The second authentication request may include, without limitation, the network information related to each of the plurality of O-cloud entities to be authenticated and operator CA certificate. The second authentication request may be IKE_AUTH Request (Tsi: Traffic selectors from Core and Management domains).

In an embodiment, upon transmitting the second authentication request, the base station 101 may be configured to establish the second secure tunnel 135 between the operator network system 105 and the base station 101 when the network information related to each of the plurality of O-cloud entities is authenticated. The operator network system 105 may validate the network information received from the base station 101 to establish second secure tunnel 135 with the network information transmitted by the network operator system in response to the O-cloud available registration request received from the base station 101. The operator network system 105 may also validate the operator CA certificate received from the base station 101. Upon validating the network information and the operator CA certificate, the second secure tunnel 135 is established. In an embodiment, the established second secure tunnel 135 allows bi-directional traffic related to each of the plurality of O-cloud entities.

Figure 2:
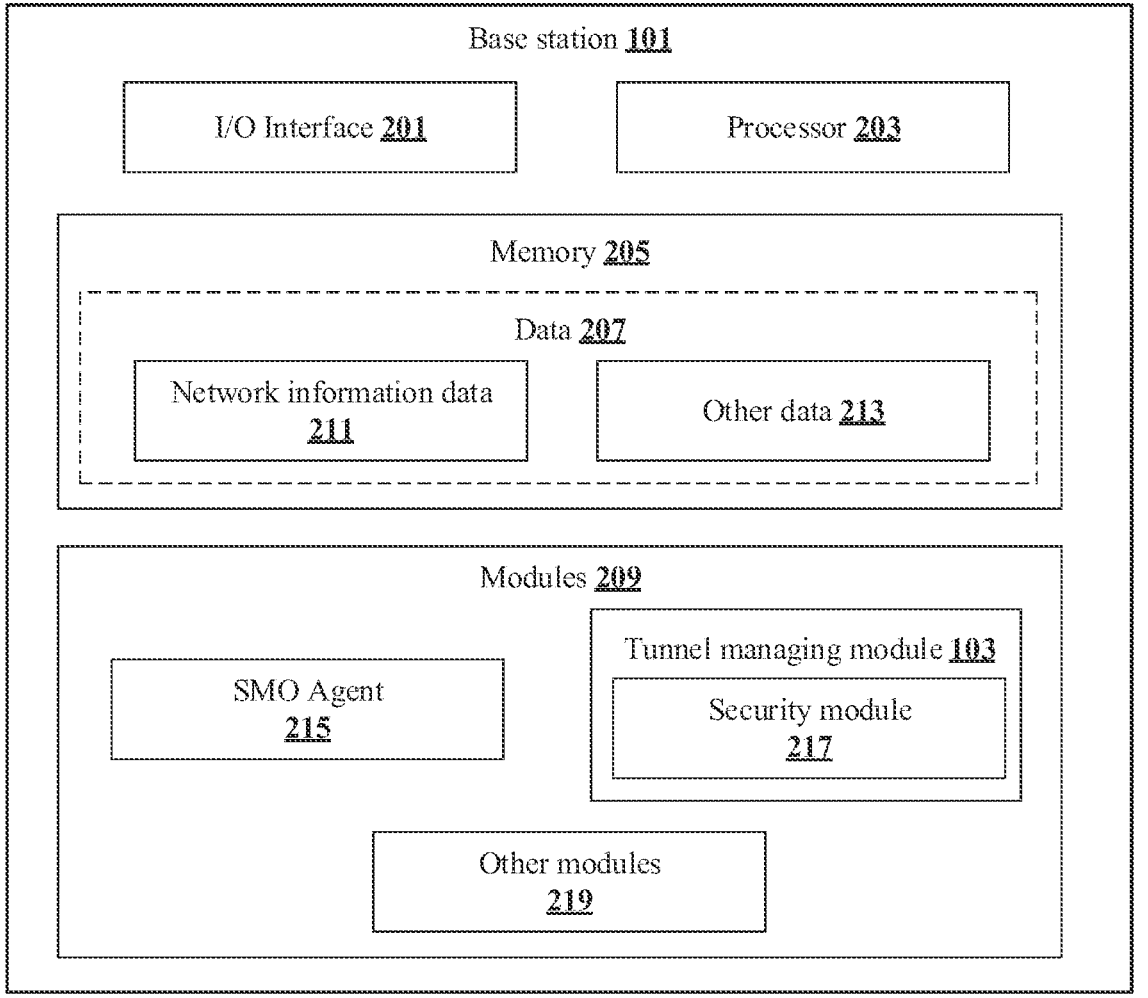
FIG. 2 shows a detailed block diagram of a base station, in accordance with some embodiments of the present disclosure.

FIG. 2 shows a detailed block diagram of the base station 101, in accordance with some embodiments of the present disclosure.

In some implementations, the base station 101 may include an I/O interface 201, a processor 203 and a memory 205. In an embodiment, the memory 205 may be communicatively coupled to the processor 203. The processor 203 may be configured to perform one or more functions of the base station 101 for Internet Protocol (IP) assignment and secure traffic for network elements deployed over untrusted transport network, using the data 207 and the one or more modules 209 of the base station 101. In an embodiment, the memory 205 may store data 207. Although the FIG. 2 shows the hardware components of the base station 101, it is to be understood that other embodiments are not limited thereon. In other embodiments, the base station 101 may include less or a greater number of components. Further, the labels or names of the components are used only for illustrative purpose and does not limit the scope. One or more components can be combined together to perform same or substantially similar technical feature for the Internet Protocol (IP) assignment and secure traffic for network elements deployed over untrusted transport network.

In an embodiment, the data 207 stored in the memory 205 may include, without limitation, network information data 211 and other data 213. In some implementations, the data 207 may be stored within the memory 205 in the form of various data structures. Additionally, the data 207 may be organized using data models, such as relational or hierarchical data models. The other data 213 may include various temporary data and files generated by the one or more modules 209.

In an embodiment, the network information data 211 may be data related to base station 101 stored in an operator network system 105. In an embodiment, the network information data 211 may be determined during network planning. The network information data may include, without limitation, at least one of an inner Internet Protocol (IP), traffic selectors, an IP mapping related to the Open Cloud (O-cloud) and an internal Domain Name System (DNS), detected by the operator network system 105 based on the O-cloud Identification (ID). The inner IP may be the IP address of the base station 101. The traffic selectors may be range of IP addresses of each of plurality of O-cloud entities. The IP mapping may be look-up table which may map IP addresses with each of the plurality of O-cloud entities. The internal DNS may be an IP server which translates domain name to IP address. In an embodiment, the network information data 211 may be the operator network system 105 based on the O-cloud ID which is received from the base station 101. In an embodiment, the base station 101 may use the network information data 211 to establish the second secure tunnel 135 between the operator network system 105 and the base station 101. The operator network system 105 may validate the network information data 211 received from the base station 101 to establish second secure tunnel 135 with the network information data 211 transmitted by the network operator system in response to the O-cloud available registration request received from the base station 101. The second secure tunnel 135 may be established upon validating the network information data 211.

In an embodiment, the data 207 may be processed by one or more modules 209 of the base station 101. In some implementations, the one or more modules 209 may be communicatively coupled to the processor 203 for performing one or more functions of the base station 101. In an implementation, the one or more modules 209 may include, without limiting to, a Service Management and Orchestration (SMO) agent 215 (which may also be a transmitting module), a tunnel managing module 103 and other modules 219. The tunnel managing module 103 may include, without limitation, a security module 217. In an embodiment, the security module 217 may be configured to terminate and establish a secured tunnel.

As used herein, the term module may refer to an Application Specific Integrated Circuit (ASIC), an electronic circuit, a hardware processor 203 (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 219 may be used to perform various miscellaneous functionalities on the base station 101. It will be appreciated that such one or more modules 209 may be represented as a single module or a combination of different modules.

In an embodiment, the SMO agent 215 may be configured for transmitting an Open Cloud (O-cloud) available registration request to an operator network system 105 through a first secure tunnel 133 established between the operator network system 105 and the base station 101. The registration request comprises an O-cloud Identification (ID) of an O-cloud associated with base station 101 of a cell site. In an embodiment, prior to transmitting the registration request, the SMO agent 215 may be configured for transmitting a first authentication request to the operator network system 105, for obtaining an inner IP of the base station 101 and establishing the first secure tunnel 133 between the operator network system 105 and the base station 101. The first authentication request comprises a predefined certificate related to the cell site to be authenticated. Further, the security module 217 may be configured for establishing the first secure tunnel 133 when the predefined certificate received in the first authentication request is determined to be valid. A first authentication response which may include an inner IP of the base station 101 is received from the operator network system 105.

In an embodiment, the security module 217 may be configured for terminating the first secure tunnel 133 upon receiving the network information related to each of a plurality of O-cloud entities of the O-cloud through the first secure tunnel 133 from the operator network system 105 in response to the registration request.

In an embodiment, the SMO agent 215 may be configured for transmitting a second authentication request to the operator network system 105 for establishing a second secure tunnel 135 between the operator network system 105 and the base station 101. The second authentication request comprises and a base station operator signed certificate the network information related to each of the plurality of O-cloud entities to be authenticated.

In an embodiment, the security module 217 may be configured for establishing the second secure tunnel 135 between the operator network system 105 and the base station 101 when the network information related to each of the plurality of O-cloud entities is authenticated. The established second secure tunnel 135 allows bi-directional traffic related to each of the plurality of O-cloud entities.

Figure 3A:
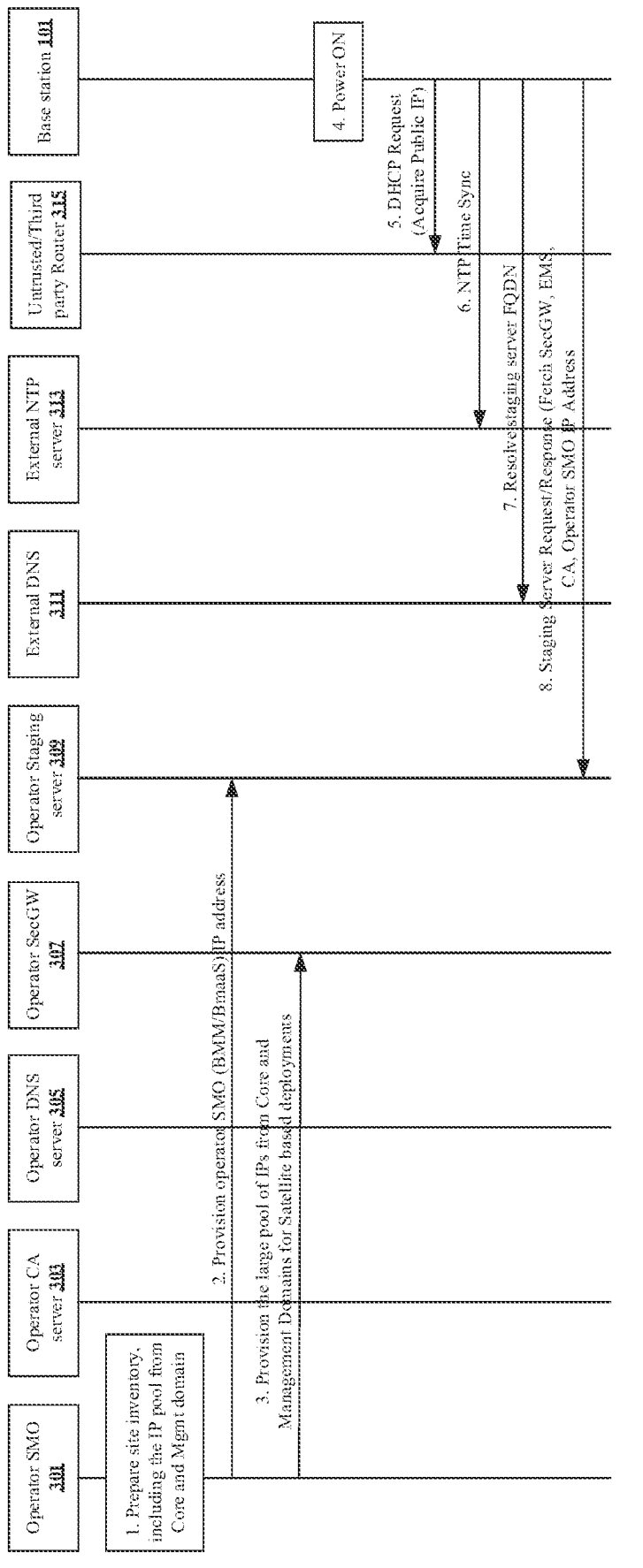
FIG. 3A shows an exemplary call flow diagram illustrating a base station discovering operator network systems secured gateway over an untrusted network, in accordance with some embodiments of the present disclosure.

FIG. 3A shows an exemplary call flow diagram illustrating a base station 101 discovering operator network systems 105 secured Gateway (GW) over an untrusted network, in accordance with some embodiments of the present disclosure.

Referring to the FIG. 3A, at step 1, as a pre-requisite, the site inventory and network planning data may be provisioned for untrusted/third-party transport-based deployments of Open Cloud (O-cloud) deployed at a base station 101. At step 2, operator Service Management and Orchestration (SMO) 301 provisions operator Secured Gateway (SecGW) 307, Element Management System (EMS), Certificate Authority (CA Server) 303, SMO details to an operator staging server 309. The operator SMO 301 may be used to enable network operators to manage and optimize the Radio Access Networks (RAN). The SecGW 307 may be a network security device used to protect network from an unauthorized access. The EMS may be used to manage one or more elements in Open RAN (ORAN) based RAN. The CA server 303 may be used to issue and manage digital certificates. The digital certificates may be used for authentication.

At step 3, the SecGW 307 may be provisioned with a large subnet of IP addresses from both management and core domains for untrusted/third-party transport-based deployments. The subnet may be a sub-network of a network which may be within a range. At step 4, the base station 101 of a cell site may be powered ON. An O-cloud may be associated with the base station 101. A plurality of O-cloud entities may be associated with the O-cloud.

At step 5, base station 101 acquires the public IP address of the operator network system 105 from the Untrusted/third-party router 315. At step 6, the base station 101 initiates Network Time Protocol (NTP) sync procedure to update local system time of the base station 101. At step 7, the base station 101 resolves the staging servers Fully Qualified Domain Name (FQDN). The FQDN may be a complete domain name which may specify its exact location in the tree hierarchy of the DNS. The FQDN may be sent to an external DNS, the external DNS may send the IP address based on the FQDN. At step 8, the base station 101 authenticates with the operator staging server 309 using vendor certificate and the base station 101 fetches the SecGW 307, CA server, CA root certificate and Bare Metal as a Service (BmaaS) (SMO), FQDNs from a Remote Method Invocation (RMI) staging server.

Figure 3B:
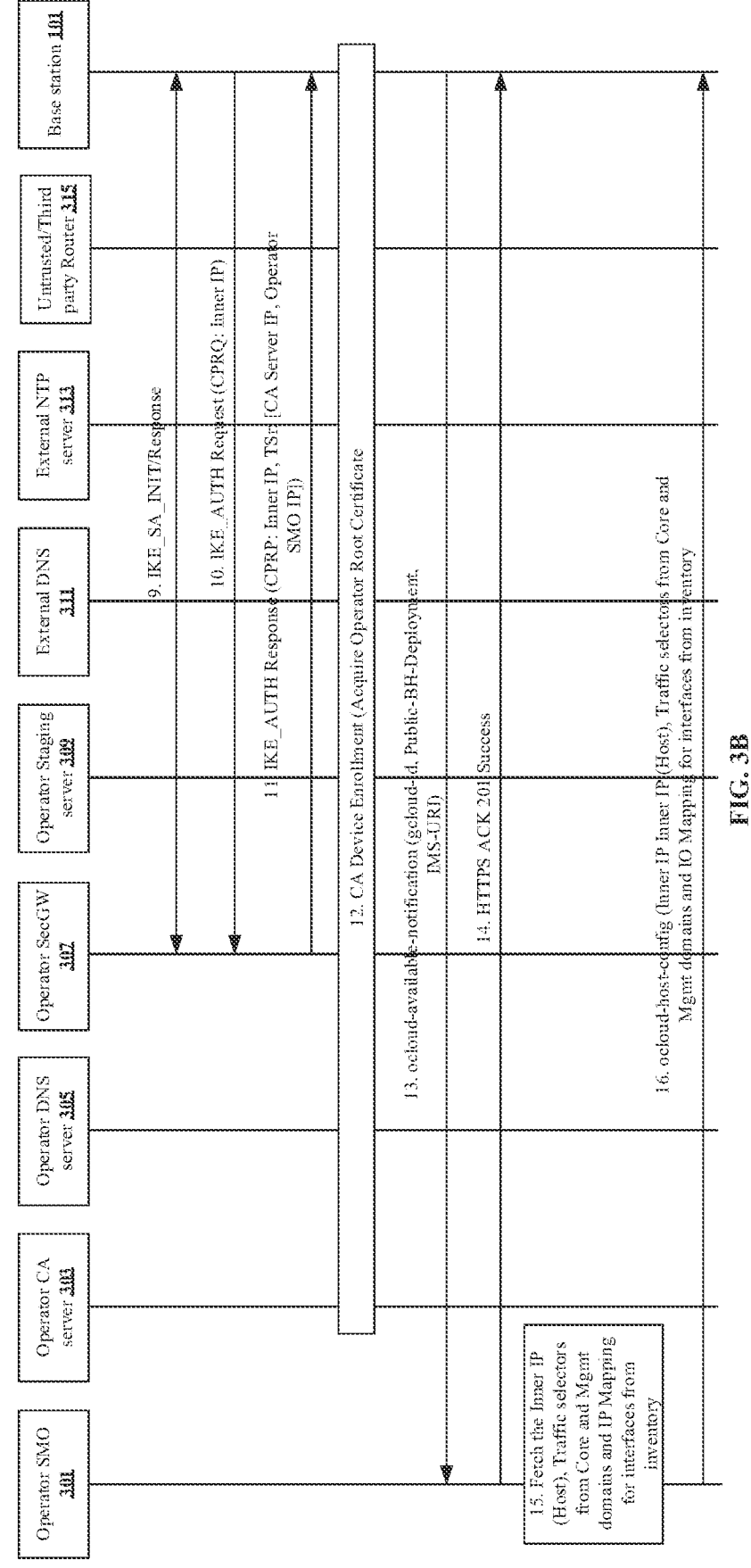
FIG. 3B shows an exemplary call flow diagram illustrating a first secure tunnel establishment, in accordance with some embodiments of the present disclosure.

Referring to the FIG. 3B, the procedure of establishing first secure tunnel 133 is initiated. At step 9, the base station 101 shall initiate establishment of the first secure tunnel 133 by initiating IKE_SA_INIT procedure. The first secure tunnel 133 is also referred as first IP secured tunnel. At step 10, the base station 101 may initiate IKE_AUTH Request towards the SecGW 307 of the operator network system 105 requesting inner IP and internal DNS Server. The base station 101 may use vendor certificate for authentication. At step 11, the SecGW 307 authenticates the base station 101 using vendor CA certificate and respond with IKE_AUTH Response with the inner IP to the base station 101. At step 12, the base station 101 may initiate CA Enrollment procedure using CA root certificate and acquire operator CA certificate. At step 13, the base station 101 may initiate Infrastructure Management Service (IMS) registration request (also referred as O-cloud available registration request) towards the SMO. Further, the base station 101 may also transmit the O-Cloud-ID (also referred as O-cloud ID) and notify that the IMS registration request is reaching over an untrusted/third-party network. At step 14, the SMO shall respond with Hypertext Transfer Protocol Secure (HTTPS) 201 success. HTTPS 201 indicates that the operator SMO 301 has successfully processed the request. At step 15, the SMO fetches inner IP, traffic selectors information from core and management domains for respective Cell Site O-Cloud (based on gO-Cloud-Id). At step 16, the operator SMO 301 transmits the host configuration to the base station 101, which shall include the inner IP, traffic selectors to be used by Cell Site O-Cloud during the second secure tunnel 135 establishment. Post this, the base station 101 terminates the first secure tunnel 133.

Figure 3C:
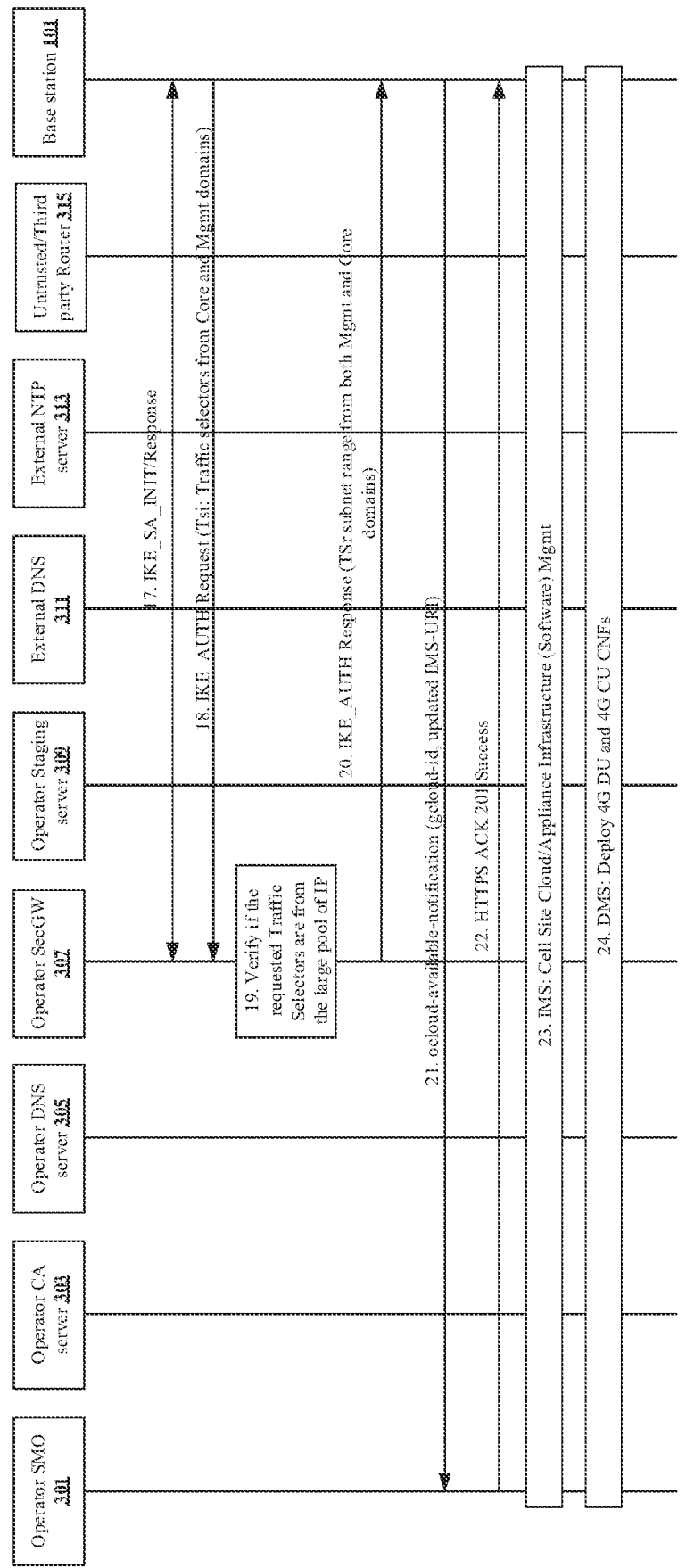
FIG. 3C shows an exemplary call flow diagram illustrating a second secure tunnel establishment, in accordance with some embodiments of the present disclosure.

Referring to the FIG. 3C, the procedure of establishing second secure tunnel 135 is initiated. At step 17, the base station 101 establishes the second secure tunnel 135 with initiating IKE_SA_INIT procedure. Post successful completion of IKE_SA_INIT procedure, at step 18, base station 101 sends IKE_AUTH request containing the traffic selectors to be allowed by SecGW 307. The base station 101 may use operator CA certificate for authentication. At step 19, the SecGW 307 verifies if the traffic selectors received from the base station 101 are within the permissible range and the traffic selectors match with the traffic selectors which were transmitted in step 16. At step 20, the SecGW 307 acknowledges IKE AUTH request from base station 101 and the second secure tunnel 135 is established. At step 21, the base station 101 may initiate IMS registration request towards the operator SMO 301 and the base station 101 may share the gO-Cloud-Id and notify updated IMS-Agent-Endpoint. The IMS-Agent-Endpoint may be a network address used by the IMS agent to communicate with the IMS core network. At step 22, the operator SMO 301 shall respond with HTTPS 201 Success. At step 23, the operator SMO 301 may initiate the remaining of IMS procedure to verify and update platform software modules on the base station 101. At step 24, the operator SMO 301 may orchestrate the 4G Centralized Unit (CU) and 4G Distributed Unit (DU) Cloud-Native Network Function (CNF) on the base station 101. In some embodiments, the operator SMO 301 may orchestrate 5G CU and DU CNF on the base station 101.

FIG. 4 shows a flowchart illustrating a method of Internet Protocol (IP) assignment and secure traffic for network elements deployed over untrusted transport network, in accordance with some embodiments of the present disclosure.

As illustrated in FIG. 4, the method 400 may include one or more blocks illustrating a method of Internet Protocol (IP) assignment and secure traffic for network elements deployed over untrusted transport network, in accordance with some embodiments of the present disclosure illustrated in FIG. 2. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the method 400 includes transmitting, by a processor 203 of the base station 101, an Open Cloud (O-cloud) available registration request to an operator network system 105 through a first secure tunnel 133 established between the operator network system 105 and the base station 101. The registration request comprises an O-cloud Identification (ID) of an O-cloud associated with base station 101 of a cell site. In an embodiment, prior to transmitting the registration request, the processor 203, transmits a first authentication request to the operator network system 105, for obtaining an inner IP of the base station 101 and establishing the first secure tunnel 133 between the operator network system 105 and the base station 101. The first authentication request comprises a predefined certificate related to the cell site to be authenticated. Thereafter, the processor 203 establishes the first secure tunnel 133 when the predefined certificate received in the first authentication request is determined to be valid. A first authentication response comprising an inner IP of the base station 101 is received from the operator network system 105.

At block 403, the method 400 includes terminating, by the processor 203, the first secure tunnel 133 upon receiving a network information related to each of a plurality of O-cloud entities of the O-cloud through the first secure tunnel 133 from the operator network system 105 in response to the registration request. The network information may include, without limitation, at least one of an inner IP, traffic selectors, an IP mapping related to the O-cloud and an internal Domain Name System (DNS), detected by the operator network system 105 based on the O-cloud ID.

At block 405, the method 400 includes transmitting, by the processor 203, a second authentication request to the operator network System 105 for establishing a second secure tunnel 135 between the operator network system 105 and the base station 101. The second authentication request comprises the network information related to each of the plurality of O-cloud entities and a base station operator signed certificate to be authenticated.

At block 407, the method 400 includes establishing, by the processor 203, the second secure tunnel 135 between the operator network system 105 and the base station 101 when the network information related to each of the plurality of O-cloud entities is authenticated. The established second secure tunnel 135 allows bi-directional traffic related to each of the plurality of O-cloud entities.

Claimable Aspects:

1. In an embodiment, a base station 101 for Internet Protocol (IP) assignment and secure traffic for network elements deployed over untrusted transport network is disclosed in an aspect. The base station 101 comprises a processor 203 and a memory 205. The memory 205 is communicatively coupled to the processor 203 and stores processor 203-executable instructions, which on execution, cause the processor 203 to transmit an Open Cloud (O-cloud) available registration request to an operator network system 105 through a first secure tunnel 133 established between the operator network system 105 and the base station 101. The registration request comprises an O-cloud Identification (ID) of an O-cloud associated with base station 101 of a cell site. Further, the processor 203 terminates the first secure tunnel 133 upon receiving a network information related to each of a plurality of O-cloud entities of the O-cloud through the first secure tunnel 133 from the operator network system 105 in response to the registration request. Thereafter, the processor 203, transmits a second authentication request to the operator network system 105 for establishing a second secure tunnel 135 between the operator network system 105 and the base station 101. The second authentication request comprises the network information related to each of the plurality of O-cloud entities and a base station 101 operator signed certificate to be authenticated. Finally, the processor 203 establishes the second secure tunnel 135 between the operator network system 105 and the base station 101 when the network information related to each of the plurality of O-cloud entities is authenticated. The established second secure tunnel 135 allows bi-directional traffic related to each of the plurality of O-cloud entities.

2. In an embodiment, the base station 101 as described in preceding aspect 1, wherein prior to transmitting the registration request, the processor 203 is configured to transmit a first authentication request to the operator network system 105, for obtaining an inner IP of the base station 101 and establishing the first secure tunnel 133 between the operator network system 105 and the base station 101, wherein the first authentication request comprises a predefined certificate related to the cell site to be authenticated. The processor 203 establishes the first secure tunnel 133 when the predefined certificate received in the first authentication request is determined to be valid, wherein a first authentication response comprising an inner IP of the base station 101 is received from the operator network system 105.

3. In an embodiment, the base station 101 as described in preceding aspect 1 to 2, wherein the network information comprises at least one of an inner IP, traffic selectors, an IP mapping related to the O-Cloud and an internal Domain Name System (DNS), detected by the operator network system 105 based on the O-cloud ID.

4. In another embodiment, a method for Internet Protocol (IP) assignment and secure traffic for network elements deployed over untrusted transport network is disclosed in an aspect. The method includes transmitting, by a base station 101, an Open Cloud (O-cloud) available registration request to an operator network system 105 through a first secure tunnel 133 established between the operator network system 105 and the base station 101. The registration request comprises an O-cloud Identification (ID) of an O-cloud associated with base station 101 of a cell site. Further, the method comprises terminating the first secure tunnel 133 upon receiving a network information related to each of a plurality of O-cloud entities of the O-cloud through the first secure tunnel 133 from the operator network system 105 in response to the registration request. Thereafter, the method comprises transmitting a second authentication request to the operator network system 105 for establishing a second secure tunnel 135 between the operator network system 105 and the base station 101. The second authentication request comprises the network information related to each of the plurality of O-cloud entities and a base station 101 operator signed certificate to be authenticated. Finally, the method comprises establishing the second secure tunnel 135 between the operator network system 105 and the base station 101 when the network information related to each of the plurality of O-cloud entities is authenticated. The established second secure tunnel 135 allows bi-directional traffic related to each of the plurality of O-cloud entities.

5. In an embodiment, the method as described in preceding aspect 4, wherein prior to transmitting the registration request comprises transmitting, by the base station 101, a first authentication request to the operator network system 105, for obtaining an inner IP of the base station 101 and establishing the first secure tunnel 133 between the operator network system 105 and the base station 101, wherein the first authentication request comprises a predefined certificate related to the cell site to be authenticated. The method includes establishing the first secure tunnel 133 when the predefined certificate received in the first authentication request is determined to be valid, wherein a first authentication response comprising an inner IP of the base station 101 is received from the operator network system 105.

6. In an embodiment, the method as described in preceding aspect 4 to 5, wherein the network information comprises at least one of an inner IP, traffic selectors, an IP mapping related to the O-cloud and an internal Domain Name System (DNS), detected by the operator network system 105 based on the O-cloud ID.

7. In yet another embodiment, a non-transitory computer readable medium including instructions stored thereon that when processed by at least one processor 203, cause a base station 101 to perform operations comprising transmitting an Open Cloud (O-cloud) available registration request to an operator network system 105 through a first secure tunnel 133 established between the operator network system 105 and the base station 101. The registration request comprises an O-cloud Identification (ID) of an O-cloud associated with base station 101 of a cell site. Further, the instructions cause the processor 203 to determine a status change of one or more cells of the serving DU and one or more candidate/target cells of a candidate/target DU amongst a plurality of candidate/target DU upon changing the serving cell for the UE to a new serving cell. The new serving cell is one of the one or more candidate/target cells of a candidate/target DU. Thereafter, the instructions cause the processor 203 to transmit a second authentication request to the operator network system 105 for establishing a second secure tunnel 135 between the operator network system 105 and the base station 101. The second authentication request comprises the network information related to each of the plurality of O-cloud entities and a base station 101 operator signed certificate to be authenticated. Finally, the instructions cause the processor 203 to establish the second secure tunnel 135 between the operator network system 105 and the base station 101 when the network information related to each of the plurality of O-cloud entities is authenticated. The established second secure tunnel 135 allows bi-directional traffic related to each of the plurality of O-cloud entities.

8. In an embodiment, the medium as described in preceding aspect 7, wherein prior to transmitting the registration request cause the processor 203 to transmit a first authentication request to the operator network system 105, for obtaining an inner IP of the base station 101 and establishing the first secure tunnel 133 between the operator network system 105 and the base station 101, wherein the first authentication request comprises a predefined certificate related to the cell site to be authenticated. The processor 203 establishes the first secure tunnel 133 when the predefined certificate received in the first authentication request is determined to be valid, wherein a first authentication response comprising an inner IP of the base station 101 is received from the operator network system 105.

9. In an embodiment, the medium as described in preceding aspect 7 to 8, wherein the network information comprises at least one of an inner IP, traffic selectors, an IP mapping related to the O-cloud and an internal Domain Name System (DNS), detected by the operator network system 105 based on O-cloud ID.

Advantage of the Embodiments of the Present Disclosure are Illustrated Herein In an embodiment, the proposed method extends the operator network isolation till the base station. The proposed method allocates and provisions the elements within the base station with the Internet Protocol (IP) addresses. This helps in handling the traffic at the operator network system as each entity in the base station is allocated with the IP addresses and bi-direction traffic is allowed from each entity in the base station.

As stated above, it shall be noted that the method of the present disclosure may be used to overcome various technical problems related to Internet Protocol (IP) assignment and secure traffic for network elements deployed over untrusted transport network. In other words, the disclosed method has a practical application and provides a technically advanced solution to the technical problems associated with the existing approach into Internet Protocol (IP) assignment and secure traffic for network elements deployed over untrusted transport network.

In light of the technical advancements provided by the disclosed method, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present disclosure are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Environment |
| 101 | Base station |
| 103 | Tunnel managing module |
| 105 | Operator network system |
| 107 | Untrusted third party network |
| 111 | Dynamic Host Configuration Protocol (DHCP) (local) |
| 113 | Open-Centralized Unit (O-CU) |
| 115 | Open-Distributed Unit (O-DU) |
| 117 | Open-Cloud (O-cloud) |
| $119_1$-$119_N$ | One or more Open-Radio Unit (O-RU) |
| 121 | Service Management and Orchestration (SMO) |
| 123 | Evolved Packet Core (EPC)/CORE |
| 125 | Certificate Authority (CA) server |
| 127 | O-CU of the operator network system |
| 129 | Dynamic Host Configuration Protocol (DHCP) + Domain Name System (DNS) |
| 131 | O-cloud of the operator network system |
| 133 | First secure tunnel |
| 135 | Second secure tunnel |
| 201 | I/O Interface |
| 203 | Processor |
| 205 | Memory |
| 207 | Data |
| 209 | Modules |
| 211 | Network information data |
| 213 | Other data |
| 215 | SMO agent |
| 217 | Security module |
| 219 | Other modules |

We claim:

1. A base station (101), comprising:
a memory storing instructions; and
a processor configured to execute the instructions to:
transmit an Open Cloud (O-cloud) available registration request to an operator network system (105) through a first secure tunnel (133) established between the operator network system (105) and the base station (101), wherein the registration request comprises an O-cloud Identification (ID) of an O-cloud associated with base station (101) of a cell site;
terminate the first secure tunnel (133) upon receiving a network information related to each of a plurality of O-cloud entities of the O-cloud through the first secure tunnel (133) from the operator network system (105) in response to the registration request;
transmit a second authentication request to the operator network system (105) for establishing a second secure tunnel (135) between the operator network system (105) and the base station (101), wherein the second authentication request comprises the network information related to each of the plurality of O-cloud entities and a base station (101) operator signed certificate to be authenticated; and
establish the second secure tunnel (135) between the operator network system (105) and the base station (101) when the network information related to each of the plurality of O-cloud entities is authenticated, wherein the established second secure tunnel (135) allows bi-directional traffic related to each of the plurality of O-cloud entities.

2. The base station (101) as claimed in claim 1, wherein prior to transmitting the registration request, the processor is configured to:
transmit a first authentication request to the operator network system (105), for obtaining an inner IP of the base station (101) and establishing the first secure tunnel (133) between the operator network system (105) and the base station (101), wherein the first authentication request comprises a predefined certificate related to the cell site to be authenticated; and
establish the first secure tunnel (133) when the predefined certificate received in the first authentication request is determined to be valid, wherein a first authentication response comprising an inner IP of the base station (101) is received from the operator network system (105).

3. The base station (101) as claimed in claim 1, wherein the network information comprises at least one of an inner IP, traffic selectors, an IP mapping related to the O-cloud and an internal Domain Name System (DNS), detected by the operator network system (105) based on the O-cloud ID.

4. A method, comprising:
transmitting, by a base station (101), an Open Cloud (O-cloud) available registration request to an operator network system (105) through a first secure tunnel (133) established between the operator network system (105) and the base station (101), wherein the registration request comprises an O-cloud Identification (ID) of an O-cloud associated with base station (101) of a cell site;
terminating, by the base station (101), the first secure tunnel (133) upon receiving a network information related to each of a plurality of O-cloud entities of the O-cloud through the first secure tunnel (133) from the operator network system (105) in response to the registration request;
transmitting, by the base station (101), a second authentication request to the operator network system (105) for establishing a second secure tunnel (135) between the operator network system (105) and the base station (101), wherein the second authentication request comprises the network information related to each of the plurality of O-cloud entities and a base station (101) operator signed certificate to be authenticated; and
establishing, by the base station (101), the second secure tunnel (135) between the operator network system (105) and the base station (101) when the network information related to each of the plurality of O-cloud entities is authenticated, wherein the established second secure tunnel (135) allows bi-directional traffic related to each of the plurality of O-cloud entities.

5. The method as claimed in claim 4, wherein prior to transmitting the registration request the method comprises:
transmitting, by the base station (101), a first authentication request to the operator network system (105), for obtaining an inner IP of the base station (101) and establishing the first secure tunnel (133) between the operator network system (105) and the base station (101), wherein the first authentication request comprises a predefined certificate related to the cell site to be authenticated; and
establishing, by the base station (101), the first secure tunnel (133) when the predefined certificate received in the first authentication request is determined to be valid, wherein a first authentication response comprising an inner IP of the base station (101) is received from the operator network system (105).

6. The method as claimed in claim 4, wherein the network information comprises at least one of an inner IP, traffic selectors, an IP mapping related to the O-cloud and an internal Domain Name System (DNS), detected by the operator network system (105) based on the O-cloud ID.

7. A non-transitory computer readable medium including instructions stored thereon that when processed by at least one processor, cause a base station (101) to perform operations comprising:

transmitting, by a base station (101), an Open Cloud (O-cloud) available registration request to an operator network system (105) through a first secure tunnel (133) established between the operator network system (105) and the base station (101), wherein the registration request comprises an O-cloud Identification (ID) of an O-cloud associated with base station (101) of a cell site;

terminating, by the base station (101), the first secure tunnel (133) upon receiving a network information related to each of a plurality of O-cloud entities of the O-cloud through the first secure tunnel (133) from the operator network system (105) in response to the registration request;

transmitting, by the base station (101), a second authentication request to the operator network system (105) for establishing a second secure tunnel (135) between the operator network system (105) and the base station (101), wherein the second authentication request comprises the network information related to each of the plurality of O-cloud entities and a base station (101) operator signed certificate to be authenticated; and establishing, by the base station (101), the second secure tunnel (135) between the operator network system (105) and the base station (101) when the network information related to each of the plurality of O-cloud entities is authenticated, wherein the established second secure tunnel (135) allows bi-directional traffic related to each of the plurality of O-cloud entities.

8. The medium as claimed in claim 7, wherein prior to transmitting the registration request the instructions cause the processor to:

transmit a first authentication request to the operator network system (105), for obtaining an inner IP of the base station (101) and establishing the first secure tunnel (133) between the operator network system (105) and the base station (101), wherein the first authentication request comprises a predefined certificate related to the cell site to be authenticated; and establish the first secure tunnel (133) when the predefined certificate received in the first authentication request is determined to be valid, wherein a first authentication response comprising an inner IP of the base station (101) is received from the operator network system (105).

9. The medium as claimed in claim 7, wherein the network information comprises at least one of an inner IP, traffic selectors, an IP mapping related to the O-cloud and an internal Domain Name System (DNS), detected by the operator network system (105) based on O-cloud ID.

* * * * *